May 3, 1927. 1,627,089
A. HALPIN
INSTRUMENT ATTACHMENT
Filed March 18, 1926
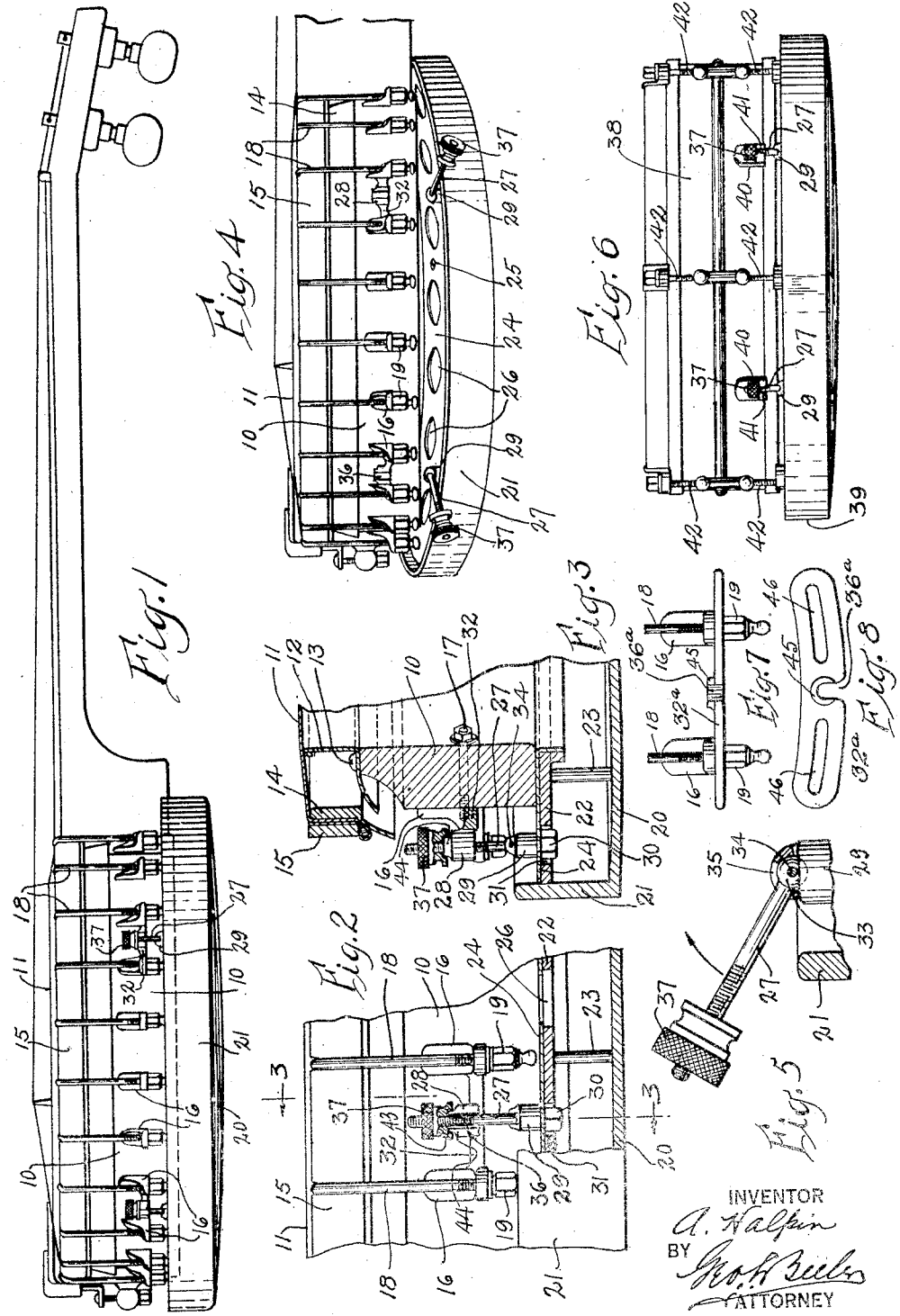

Patented May 3, 1927.

1,627,089

UNITED STATES PATENT OFFICE.

ABRAHAM HALPIN, OF NEW YORK, N. Y.

INSTRUMENT ATTACHMENT.

Application filed March 18, 1926. Serial No. 95,581.

This invention relates to musical instruments and has particular reference to resonance chambers.

Among the objects of this invention is to provide a musical instrument having a resonance chamber which is attachable to or detachable from the main body of the instrument with greater facility than has heretofore been possible as for the purpose of adjusting the instrument in such manner as the particular type of instrument may require.

Another object of this invention is to provide attachment means for engaging the resonance chamber with the main body of the instrument which means are of the simplest character and operative with the maximum celerity for the purpose aforesaid.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a side elevation showing the resonance chamber attached to a banjo.

Fig. 2 is an enlarged fragmentary view with parts in section showing the invention.

Fig. 3 is a sectional view on the line 3—3 of Fig. 2.

Fig. 4 is a fragmentary view of the instrument shown in Fig. 1 and with the resonance chamber in course of being removed.

Fig. 5 is a fragmentary detail view of the attachment means.

Fig. 6 is a side elevation of a drum with the resonance chamber attached.

Fig. 7 is a fragmentary view showing a modification of a feature of the attachment means.

Fig. 8 is a plan view of the modification shown in Fig. 7.

Referring now more specifically to the drawings, I show my invention as used generally in connection with any musical instrument such as a banjo having a main body 10 of cylindrical form which co-operates with suitable means for rigidly supporting a membrane or sounding member 11. It will be understood that the specific arrangement or details shown may assume any suitable or convenient form, and that the construction shown is merely illustrative to aid in the explanation of the advantages of the invention and the broad idea disclosed will be indicated hereinafter.

An annular supporting member or flange 12 is secured to the body 10 at 13 and supports the sounding member. A plurality of inner and outer rings 14 and 15 hold the sounding member securely along the periphery thereof. Brackets 16 secured to the body 10 by screws 17 carry hooks 18 which engage the outer ring 15 so that when tension is exerted on said hooks as by means of nuts 19, the sounding member 11 is stretched taut over the supporting means 13 whereby the quality of the tone can be improved. It will be observed, accordingly that the tension means are operative from a side of the main body of the instrument opposite to that upon which the sounding member is positioned.

A tone or resonance chamber 20 is arranged to be engaged with the body 10 at a side thereof opposite to the sounding member. Said resonance chamber may take any suitable form or construction within the scope of this invention, but includes preferably a base plate and a cylindrical wall 21 which is disposed to be coaxial with the body 10 and to lie without said body. An annular supporting flange 22 is provided to support said body or retain the same in suitable relation to the resonance chamber. Said flange 22 is preferably fixed rigidly to the wall 21 and posts 23 or the like to strengthen the same. A metal plate 24 tops the flange 22 and is secured thereto by screws 25. Sound openings 26 are provided through the flange and the plate.

My invention provides means whereby the resonance chamber can be secured strongly to the body 10 of the instrument and yet be readily detachable therefrom to render the nuts 19 accessible to a socket wrench for tightening the sounding member. In other words, since the resonance chamber is of greater size than the body 10 and consequently extends beneath the nuts 19, it is essential that the resonance chamber be removed easily from the instrument to permit the operator to manipulate the means for tightening the sounding member with the usual ease and celerity.

Accordingly this invention takes the form of fastening means operative between the music producing means and the resonance chamber, and including an engagement member 27 movable at an angle to the axis of said chamber for engaging a suitable yoke member 28 on the body 10. A socket member 29 is secured to the plate 24 by means of a bolt 30, an opening 31 being provided in the flange 22 to receive the head of the bolt. Thus the socket member is secured to the plate before the same is attached to the flange 22 by the screws 25. The yoke member 28 is supported by a bridge 32 which extends from one bracket 16 to an adjacent one, or preferably the complete bridge takes the place of two standard brackets. A movable engagement member 27 may be provided with a ball 33 at the lower end thereof to be received in the socket member, a pin 34 serving to retain the engagement member in movable relation only in a plane passing through the axis of the resonance chamber. The slot 35 in the socket member permits the shank of the engagement member to move as aforesaid. The yoke member 28 is provided with a vertical opening or slot 36 in alinement with the member 27 to receive the same. A thumb nut 37 is threaded on the free end of the engagement member. The operation of the fastening means will accordingly be understood as follows: The engagement member is tilted about its pivotal axis 34 until it is received in the opening 36, and then the thumb nut is screwed down, whereby the body 10 is caused to bear snugly against the resonance chamber. It will be understood that while various specific details of construction have been described herein any fastening means can be used within the scope of this invention which is operative as between a musical instrument and a resonance chamber to facilitate attachment to or disengagement of the one from the other.

Any suitable number of said fastening means can be used, though I prefer to use four spaced at substantially equal angles apart. Thus, observing Fig. 4, assuming it is desired to tighten the sounding member, the nuts 37 are loosened, whereby the engagement members 27 drop open, thus permitting the resonance chamber to be removed as shown.

To indicate the general applicability of my invention to instruments of all kinds, I show a drum 38, a resonance chamber 39, and fastening means therebetween including the movable members 27 pivotally mounted on socket members 29, brackets 40 being provided on the body of the drum slotted at 41 to receive the members 27, whereby the thumb nuts 37 are manipulated. Upon removal of the resonance chamber screws 42 are manipulatable to tighten, by means of a socket wrench or the like, the membrane adjacent to said chamber.

The nut 37 may be provided with an annular recess 43 coaxial therewith to receive a shoulder 44 which is circular except for the break at the slot 36. Should the nut loosen accidentally, the shoulder will still retain the nut engaged with the yoke member 28 and prevent the resonance chamber from becoming detached.

A modification of the attachment means is shown in Fig. 7 wherein a special bridge 32ª is arranged to co-operate separably and adjustably with a plurality of standard brackets 16 that are mounted in the same general manner as indicated hereinbefore. The nuts 19 co-operate with hooks 18 to retain the bridge in securely fixed position between the anchor members and the nuts. The bridge is provided with means for engaging the movable attachment member 27, as when the same is tilted into a slot 36ª of the bridge member, the nut 37 being positioned on the shoulder 45 that surrounds a part of the slot, the shoulder being receivable within the recess of the nut 37 as described hereinbefore. The bridge member follows the contour of the body of the instrument and is provided with openings or slots 46 through which the stems 18 pass so as to render the bridge member adjustable circumferentially of the body of the instrument to the extent and for the purpose that the bridge may be engageable and mounted in place regardless of the precise spacing of the brackets.

I claim:

1. In a musical instrument, the combination with a circular body, a vibrating member stretched over the body to produce a sound, and tension means on said body for retaining said sound producing member stretched taut upon the body, and manipulatable from a side of the body opposite the sound producing member, of a resonance chamber, and fastening means for retaining said chamber in detachable engagement with said body opposite to the sounding member and adjacent to the tension means, said fastening means including a yoke member secured to the chamber, a movable member having pivotal engagement with the yoke member, and a bridge member on the body having a lateral opening to receive the movable member when the same is swung around its pivot, the movable member having a head to grip the bridge member in holding position.

2. In a musical instrument, the combination with means for producing music including a body of substantially cylindrical form, a substantially cylindrical resonance chamber, and a sounding member on the body opposite to said resonance chamber, of means including a plurality of brackets secured to the body and operative to retain the sounding member stretched taut on the body, and fastening means to attach the resonance chamber detachably to said body and in substantially coaxial relation therewith, said brackets being spaced circumferentially along the outside of the body, a bridge being provided supported by a pair of adjacent brackets, a yoke member on said bridge, and a tiltable member pivoted on said chamber to be movable to engage the yoke member to fasten the chamber to the body.

3. In a musical instrument, the combination with means for producing music including a body of substantially cylindrical form, a substantially cylindrical resonance chamber, and a sounding member on the body opposite to the resonance chamber, of means to retain the sounding member stretched taut on the body and adjustable from that side of the body at which the resonance chamber is positioned, and means to detachably secure the resonance chamber to the body including a yoke member on the body, and a pivoted member on the chamber engageable with the yoke member for the purpose aforesaid, the pivoted member carrying a nut having an axial recess, the yoke member having a shoulder receivable into the recess to prevent pivotal movement of the pivoted member except when the nut is disengaged from the yoke member, the nut serving when tightened on the yoke means to render the chamber rigidly connected to the body.

In testimony whereof I affix my signature.

ABRAHAM HALPIN.